Jan. 3, 1967  L. E. A. RENART  3,295,793
KITE-TYPE AIRCRAFT

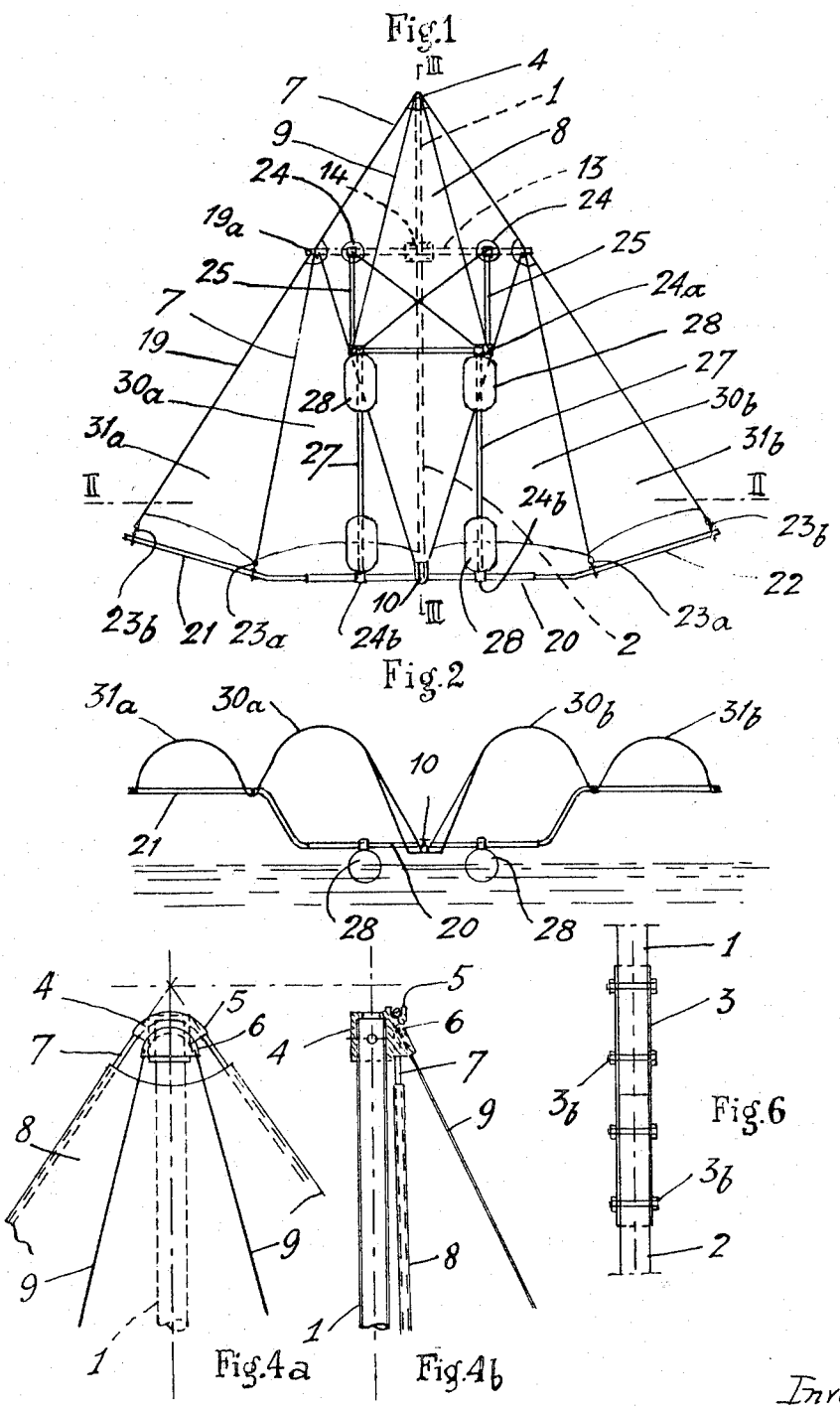

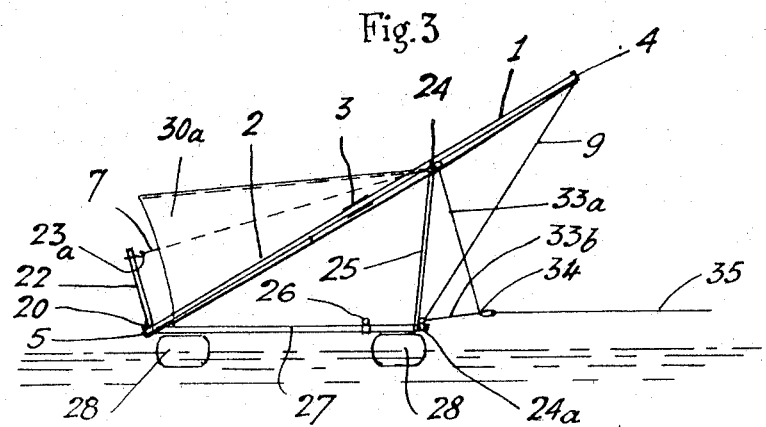
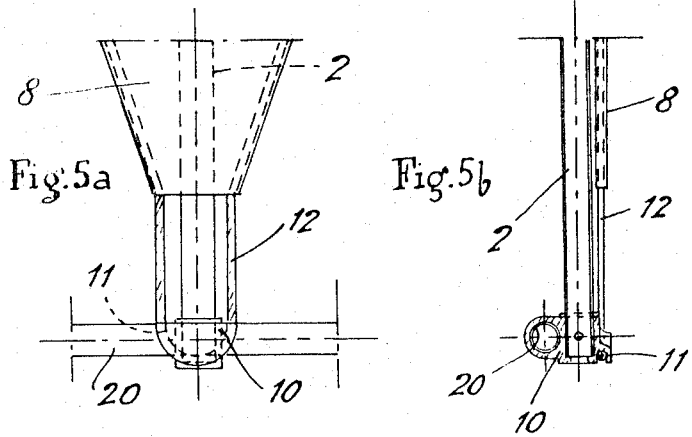
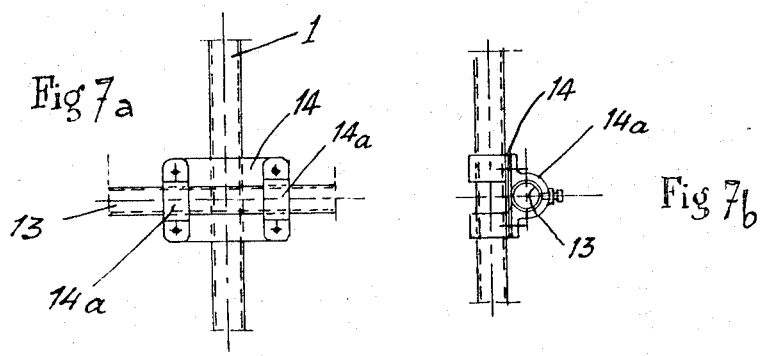

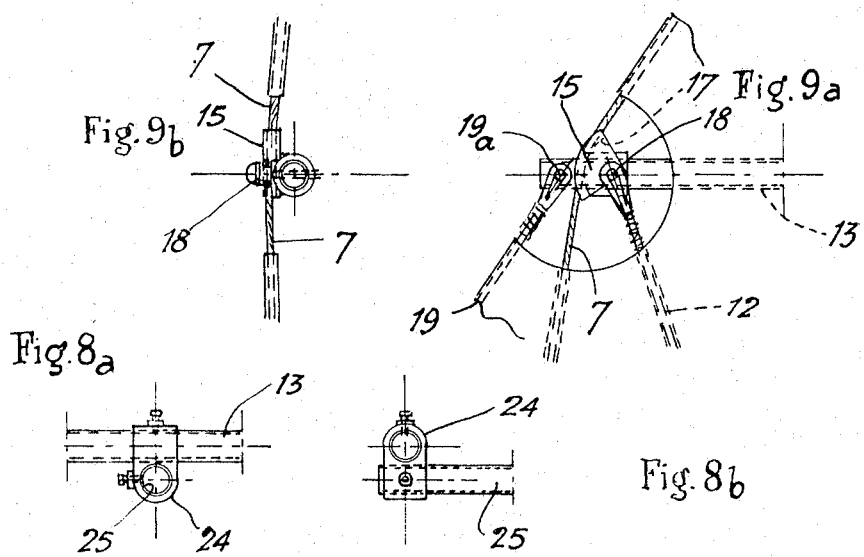
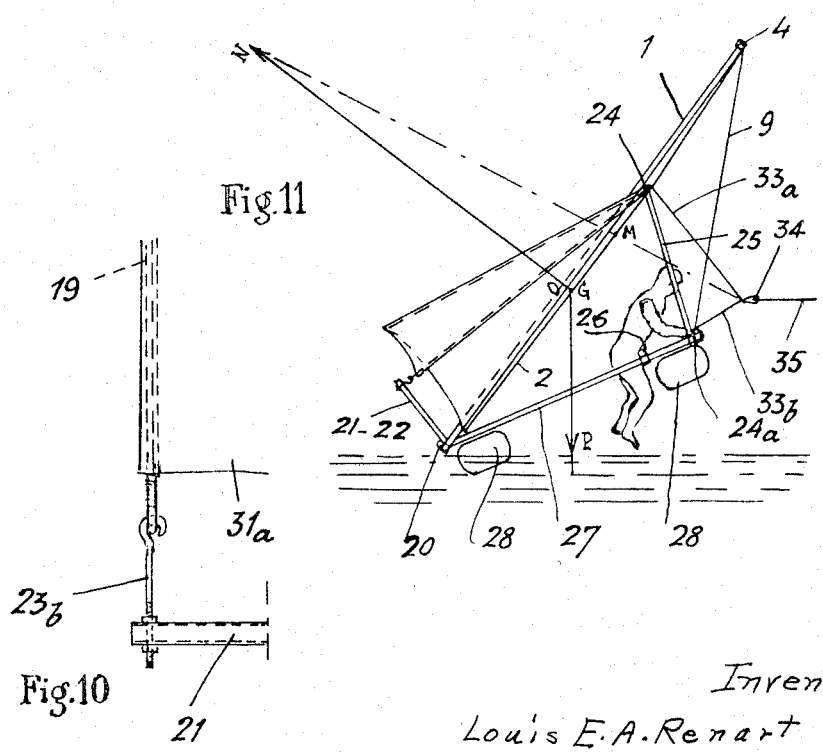

Filed Feb. 3, 1965  4 Sheets-Sheet 4

Inventor
Louis E.A. Renart
By Stevens, Davis, Miller & Mosher
Attorneys

United States Patent Office 3,295,793
Patented Jan. 3, 1967

3,295,793
KITE-TYPE AIRCRAFT
Louis E. A. Renart, 9 Ave. Armand Rousseau,
Paris, France
Filed Feb. 3, 1965, Ser. No. 430,009
Claims priority, application France, Feb. 11, 1964,
963,371
7 Claims. (Cl. 244—3)

This invention relates to aircraft of the general class including kites and gliders, and more especially to such craft which are adapted to be towed by surface vehicles or craft, such as motorboats.

An object of the invention is to provide a novel man-bearing kite, especially for sporting purposes.

In recent years a sporting activity which, apparently, is a recent contribution to the field of human pastimes has been gaining increasing popularity in seaside resorts on both sides of the Atlantic. A person shod with aqua-skis or the like and carrying a parachute pack on his back is towed by means of a long rope from a fast motorboat over the surface of the sea. When the boat has gathered sufficient speed, the sportsman pulls a cord to open the parachute, whereupon the wind of relative motion acting on the parachute canopy generates a lift force which causes the parachute and the person attached to it to rise many feet above the surface. With skill and practice, long distances can be covered in this manner. The exercise, for want of a better term, will here be referred to as "aqua-flying."

It is a specific object of this invention to provide a kite-like device which will serve as an extremely advantageous substitute for parachutes in the sport of aqua-flying.

Parachutes are far from being ideally suited for the purposes of aqua-flying. They are designed for descent, not forward flight, and tend to lack stability when thus used. They are over-sensitive to gusts of wind. Take-off operations are made difficult because the initial opening of a parachute is always a touchy affair. Also, owing to the large size of the canopy it is in danger of hitting the water and fouling nearby craft. After alighting, the canopy is wetted and must be dried before the parachute can be folded and reused. Folding a parachute is at best a long and tedious procedure which requires special training and the exercise of great care if the parachute is to open reliably at next use. The folding operation is impractical aboard a small boat. All these complications are of a nature to spoil the fun of the sport for the great majority of holidaymakers.

My present invention introduces the novel sport of "aqua-kiting."

The use of a kite-like device in aquea-flying according to the invention greatly reduces or completely overcomes the difficulties just enumerated. The device is relatively compact and rigid, is open from the onset of flight rather than requiring to be unfurled from a packed condition as does a parachute, thereby facilitating take-off nor does it need to be folded after every instance of use. The aqua-flier is thus made able to alight and take off immediately as often as he likes, instead of having to wait many hours between flights as must needs be the case with a parachute owing to the drying and folding requirement. The kite device of the invention, as will be herein disclosed, has great stability in flight, both in the fore- aft and in the lateral directions. It is much safer to use, especially in rough weather. Also, it has an increased lifting power so that it will take off and soar at lower speeds of the towing craft if this is desired. This both increases safety and enhances the pleasure of the flight.

Broader objects of this invention are to provide an improved kite device possessing heightened flight performance characteristics as compared to conventional devices of that class; to provide such a device that will float and to provide such a device which will be easily taken apart, as for transportation, and rigged up for use. An important object is to provide a manned kite having floats.

Further objects and advantages of the invention and the characteristic features thereof will become apparent as the disclosure proceeds.

An embodiment of the invention is shown for purposes of illustration but not of limitation in the accompanying drawings wherein:

FIG. 1 is a front view of the improved kite as seen from its belly or under-side.

FIG. 2 is a cross section on line II—II, FIG. 1.

FIG. 3 is a longitudinal section on line III—III of FG. 1, showing the device in its floating position.

FIG. 4a is a front view, on an enlarged scale, of the upper part or nose portion of the kite.

FIG. 4b is a corresponding section on the longitudinal plane of the kite.

FIG. 5a is a front view of the central base portion of the kite and FIG. 5b is a corresponding view in section on the longitudinal plane.

FIG. 6 is a sectional view illustrating the manner in which the central longitudinal member or main spar of the kite is assembled.

FIGS. 7a and 7b are front and longitudinal-sectional views, respectively, showing the means of assembly of the central main spar and the front spar or yard.

FIGS. 8a and 8b are detail views of a junction member connecting two of the structural frame members of the device, as seen on planes parallel to one and to the other of said members respectively.

FIG. 9 is an enlarged fragmentary view of one of the side portions of the device, near one end of the forward spar, this view being taken on the same plane as FIG. 1, while FIG. 9b is a corresponding view taken on a plane normal to the cross spar.

FIG. 10 is an enlarged fragmentary view of one of the side rear portions of the device, near one end of the rear spar, the view being on the same plane as FIG. 1.

FIG. 11 is a side view of the aqua-kite at take off; and

Figure 12:
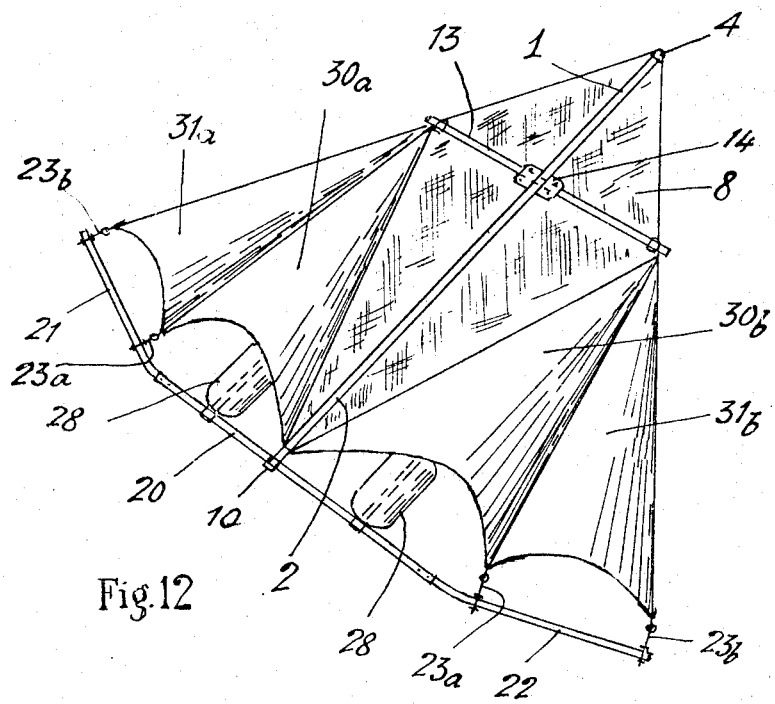
FIG. 12 is a perspective view of the aqua-kite in flight, from the rear.

Referring to the general views such as FIGS. 1 and 12, the kite-like craft of the invention or "aqua-kite" will be seen to comprise a frame that includes a central longitudinal frame member, mast, or main spar, 1–2, a front spar or yard 13 and a rear spar or yard 20. All these frame members are of lightweight, preferably tubular construction. The front spar 13 is assembled crosswise with the longitudinal main spar 1–2 at a point nearer the front end than the rear end of the latter, while the rear spar 20 is assembled to the rear end of the main spar 1–2.

A main or central sail or sheet in the general form of a diamond with unequal sides (especially visible in FIG. 12) has its corners attached in a manner to be later described to the front and rear ends of the mast or main spar member 1–2 and the ends of the front yard spar 13.

Inner, triangular, jib-like sail portions 30a and 30b have their one side edges extending coincidently with the longer, rear sides of the diamond-like central sheet, and outer triangular jib-like sail portions 31a and 31b have their inner side edges coextensive with the outer sides of the inner sail portions 30a and 30b respectively. The rear ends of the sail portions 30a and 30b, and the sail portions 31a and 31b, are attached to the rear yard 20 in the manner later indicated. As will be apparent from the drawings the triangular sail portions described assume part-conical configurations. It will also be understood that all the sail portions thus described actually form sections of a single element of suitable sheet material, e.g. nylon fabric.

An undercarriage best seen in FIGS. 1, 3 and 11, comprises a pair of parallel bars 25 having their upper ends attached to laterally spaced points of the forward yard 13, and a further pair of parallel bars 27 having their rear ends attached to corresponding points of rear yard 20. Bars 25 and 27 are interconnected at their proximate ends, the bars of the respective pairs meeting at angles somewhat greater than 90°. A crossbar 26 extends across the points of junction between the bars 25 and 27. The undercarriage is fitted with floats 28, such as deflatable, airinflated nylon bags, attached in a rectangular array to the lower bars 27. A seat, not shown, is preferably attached to crossbar 26 so as to support a flier in the general position shown in FIG. 11.

The structure will now be described in greater detail.

The central frame member or main spar is in two parts and consists of the two tubular members 1 and 2 assembled by way of a sleeve 3 and bolts 3b (FIG. 6). The main spar member 1 and forward spar 13 are interconnected by a junction member (FIGS. 7a and 7b) having orthogonally related bushes 14 and 14a for receiving the respective spars and provided with set screws for ready disassembly. Similarly the main spar member 2 and rear spar 20 are interconnected by a junction member 10 (FIGS. 5a and 5b) having crossed bushings receiving said spars.

The front end of main spar member 1 has fitted thereover a bushing 4 formed with two concentrically part-circumferential grooves 5 and 6 in the general plane of the kite. The outer groove 5 receives therein a rope or stay 7 (see FIGS. 4a and 4b) the two strands of which on either side from the main spar 1 are threaded through folds or hems formed along the front side edges of the mainsail portion 8. As shown in FIGS. 9a and 9b, the sail is formed with a semi-circular cutout around each end portion of the front yard 13. This latter is fitted with a bush having a sector plate 15 secured to it, formed with an arcuate groove 18. The rope 7 at each side is passed through this groove and is then threaded through a channel stitched in the sail along the common edge of the sail portions 30a and 31a (or 30b and 31b). The rear ends of the rope 7 are attached to the rear spar 20 at 23a.

Another pair of stay ropes 19 are passed through hems or channels formed along the outer edges of the outer conical side sail portions 31a and 31b. The stays 19 have their forward ends formed with loops which engage eyebolts 19a provided on the end bushes of the spar 13, and have their rear ends attached to the rear spar 20 near the outer end of the latter. FIG. 10 shows the manner of attachment of the stays 19 to the rear spar 20 as including hook bolts 23b adjustably threaded through the rear spar and engaging loops formed at the rear ends of the stays 19. Similar means of attachment are used for the rear ends of stays 7 at 23a.

The forward end fitting 4 on the main spar 1 (see FIGS. 4a and 4b) includes the second arcuate groove 6. This groove receives a stay rope 9. The two strands of stay 9 are passed downward toward the junction between the spars 25 and 27 at each side of the undercarriage, and are there made fast by way of adjustable hook bolts 24a similar to the hook bolts 23b (FIG. 10) and 23a. The stays 9 serve to guy the undercarriage rigidly in position.

A further stay 12 has its midpart passed around an arcuate groove 11 (FIGS. 5a and 5b) of the rear junction member and its two strands extend through channels formed along the common edges of the central sail portion 8 and the inner conical side sail portions 30a and 30b. The forward ends of the stay 12 are looped around eyebolts 18 (FIG. 9a) provided on the end fittings 15 of the front spar 13.

The front bars 25 of the undercarriage are connected to the forward spar 13 by way of junction members 24 (FIGS. 8a and 8b) having orthogonally related bushings to receive the members 13 and 25 respectively and provided with set-screws. Similar junction members not shown in detail serve to interconnect the rear ends of bars 25 with the crossbar 26, and interconnect the front and rear ends of the rear undercarriage bars 27 with crossbar 26 and with rear spar 20 respectively, at the points generally designated 24a and 24b.

It will be noted (see especially FIG. 2) that the rear spar 20 has outer end portions 21 and 22 which are offset upwardly, as well as being angled in a forward direction. The points of attachment 23a of the stays 7 are positioned on the offset portions 21 and 22 near the inner ends thereof. The dimensioning is such that the lateral spread of the inner sail portions 30a and 30b is somewhat smaller than that of the outer sail portions 31a and 31b. As will be apparent from the drawings, especially FIGS. 2 and 12, these side sail portions 30 and 31 are arranged in the form of part-conical surfaces with their convexity directed in the upward or rearward direction. The upper generatrices of these surfaces form an angle of about 25° to the plane of the central sail portion 8.

Means are provided for towing the kite from a surface vehicle, such as a motor boat and, as shown, a towline 35 has its free extremity fastened by means of a ring, grommet or similar fixture 34, preferably arranged for quick unfastening, to the four ends of an upper pair of ropes or stays 33a, and a lower pair of ropes or stays 33b. The rear ends of the four ropes 33 are attached to the four junction members 24 and 24a of the undercarriage. The upper ropes 33a are somewhat longer than the lower ropes 33b to ensure that the point of attachment 34 of the tow line is positioned, in flight, at the proper elevation with respect to the centre of gravity and the centre of pressure of the kite.

The general operation of the device for aqua-flying is as follows.

Initially the aqua-kite craft is launched so that it rests on the water by the buoyancy of the floats 28 as shown in FIG. 3. The flyer is positioned on the crossbar 26 of the undercarriage on which he may be accommodated in the seated position as shown in FIG. 11, or in a reclining or a prone position. The towline 35 is attached to a fast boat, not shown. It will be noted that in this floating condition shown in FIG. 3, the device has high stability owing to the four floats 28 and is seaworthy in its own right.

As the towing craft moves forward, the headwind acting predominantly against the flat mainsail portion 8 of the kite creates a force (see N, FIG. 11) applied at the centre of pressure of the sail, which has a horizontal rearward component and a vertical upward component. The rearward component at all times balances the forward tension force acting on the tow line 35, while the upward force tends to counteract the force of gravity. When the speed of forward motion has become great enough (about 22 knots in a specific example), the air pressure N becomes so strong that its upward component exceeds the force of gravity, and the kite becomes airborne. The altitude to which it wil rise depends on the relative wind and on the length of the tow line, just as in the case of an ordinary boy's kite, and it can be made to rise to great heights if this is desired by playing off enough line.

In this airborne condition, the device has very great flight stability. The semi-conical side sail portions 30 and 31 act essentially as channels for the smooth, non-turbulent outflow of the air filaments from beneath the flat mainsail portion 8 towards the rear, somewhat after the fashion of a bird's wings held in a position intermediate between gliding and flapping. The configuration here disclosed for said side wing portions is found to impart both longitudinal and lateral stability in flight to a marked degree, and although this stabilizing action is complex and is not understood in full detail, it may perhaps be explained without undue over-simplification through the following considerations.

The pitch attitude assumed in flight by the kite, constructed as herein described and shown, is such that the flat central wing or sail portion 8 forms an average angle of about 35° to the horizontal plane. Under these conditions, the uppermost generatrics of the semi-conical lateral wing or sail portions 30 and 31 form a much smaller angle, about 10°, with said horizontal plane. This angular value is within the range of aircraft wing incidence angles in which the position of the centre of pressure of the wing remains practically constant and insensitive to relatively large changes in forward velocity and lift force. A variation in the flight parameters may cause a variation in the pitch attitude but will not impair the longitudinal stability of the kite. Thus the lateral sail portions 30 and 31 serve as longitudinal stabilizers for the device.

The lateral sail portions 30 and 31 simultaneously provide lateral stability, essentially owing to the upward offset provided according to the invention in the rear spar 21, whereby the outermost side sails 31a and 31b are displaced upward with respect to the inner side sails 30a and 30b. This vertical offset is effective, in case of a displacement of the craft about its roll or fore-aft axis, to generate a restoring couple which tends to return the kite to its initial attitude in bank.

A further beneficial action of the semi-conical side sail portions is to produce a desirable parachute effect on cessation of the forward draft force applied to the tow line 35, whereby the kite will alight safely regardless of the altitude at which it was flying at the instant the draft force has dropped to zero.

As shown in FIG. 1, the outboard edges of the outer side sails 31a and 31b are aligned with the front sides of the diamond-shaped central sail portion 8, thus imparting a delta contour to the kite.

It has been found that the delta configuration shown for the general contour of the kite is desirable in that it apparently enhances the stabilizing features mentioned above.

As regards the dimensioning of the device, it will be understood that the surface area of the kite is an important factor. If the area is too small, impractically high forward velocities will be required to be imparted before the wind pressure has built up to a value great enough to create a lift force capable of canceling the weight of the kite plus flier, and allowing the kite to soar. Too large an area will make the device unwieldy and dangerous or too heavy to take off.

A kite device according to the disclosure has been constructed and had the following main dimensions: Total area, 15 sq. m.; total length from nose to tail, 4.2 m.; and span 5.8 m. The sail was made of Tergal fabric weighing 190 g. per sq. m. The spars were made of duralumin tubings having 32 mm. and 25 mm. outer diameter and 2 mm. thick. The weight of the fully rigged device was 25 kilograms. This craft, manned by a person weighing 70 kilograms, required a forward velocity of about 22 knots for it to take off.

The kite referred to was successfully used to aqua-fly across the Channel from Calais to Dover, a distance of 70 kilometers, on October 4, 1964, as reported in the British newspaper "Sun" for example.

What I claim is:
1. A kite device comprising
   a frame, said frame comprising
      a longitudinal main frame member,
      a forward cross member secured at right angles to the longitudinal member intermediate its ends,
      and a rear frame member secured at right angles to the longitudinal member near the rear end thereof;
   sail means secured across the frame and comprising
      a generally diamond-shaped flat central sail portion having its four apices attached to the respective ends of said longitudinal member and said forward cross member;
      a first, inner pair of part-conical, side sail portions adapted and arranged to be downwardly concave in operation having their cone apices substantially coincident with the ends of the forward cross member and having inboard edges coextensive with the rear sides of said central sail portion and having their arcuate rear edges attached to said rear cross member; and
      a second, outer pair of part-conical, downwardly-concave side sail portions adapted and arranged to be downwardly concave in operation having their cone apices substantially coincident with the ends of the forward cross member and having inboard edges coextensive with the outboard edges of said inner side sail portions and having their arcuate rear edges attached to said rear cross member, in a plane upwardly offset from the plane of said flat central sail portion and edges of the inner side sail portions,
   an undercarriage secured to said frame members below said sail means and accommodating a flyer, and
   means for attaching a tow line to said undercarriage.

2. A kite device as claimed in claim 1, wherein said outer side sail portions have their outboard edges generally aligned with the front edges of said diamond-shaped central sail portion.

3. A kite device as claimed in claim 1, wherein said front cross member is secured to the longitudinal member substantially nearer the forward than the rear end thereof.

4. A kite device as claimed in claim 1, wherein said side sail portions have their uppermost generatrices extending at angles of about 25° to the plane of said central sail portion.

5. A kite device as claimed in claim 1, including stays extending from respective ends of said frame members and generally coextensive with edges of said central and lateral sail portions, including means for adjustably tensioning said stays.

6. A kite device as claimed in claim 1, wherein said undercarriage has spaced floats secured thereto.

7. A kite device as claimed in claim 1, including junction members for detachably interconnecting said frame member and deflatable-inflatable floats attached to said undercarriage.

References Cited by the Examiner

UNITED STATES PATENTS

| | | | |
|---|---|---|---|
| 3,083,933 | 4/1963 | Cella | 244—3 |
| 3,194,521 | 7/1965 | Rider et al. | 244—154 |
| 3,241,793 | 5/1966 | Curtis et al. | 244—153 |

OTHER REFERENCES

Sunday "Parade" magazine section of Washington Post newspaper, April 12, 1959, p. 43.

MILTON BUCHLER, *Primary Examiner.*

T. MAJOR, *Assistant Examiner.*